Nov. 6, 1945.　　　　J. N. WHEELER　　　　2,388,354
ACCOUNTING MACHINE
Filed Jan. 15, 1943　　　3 Sheets-Sheet 1
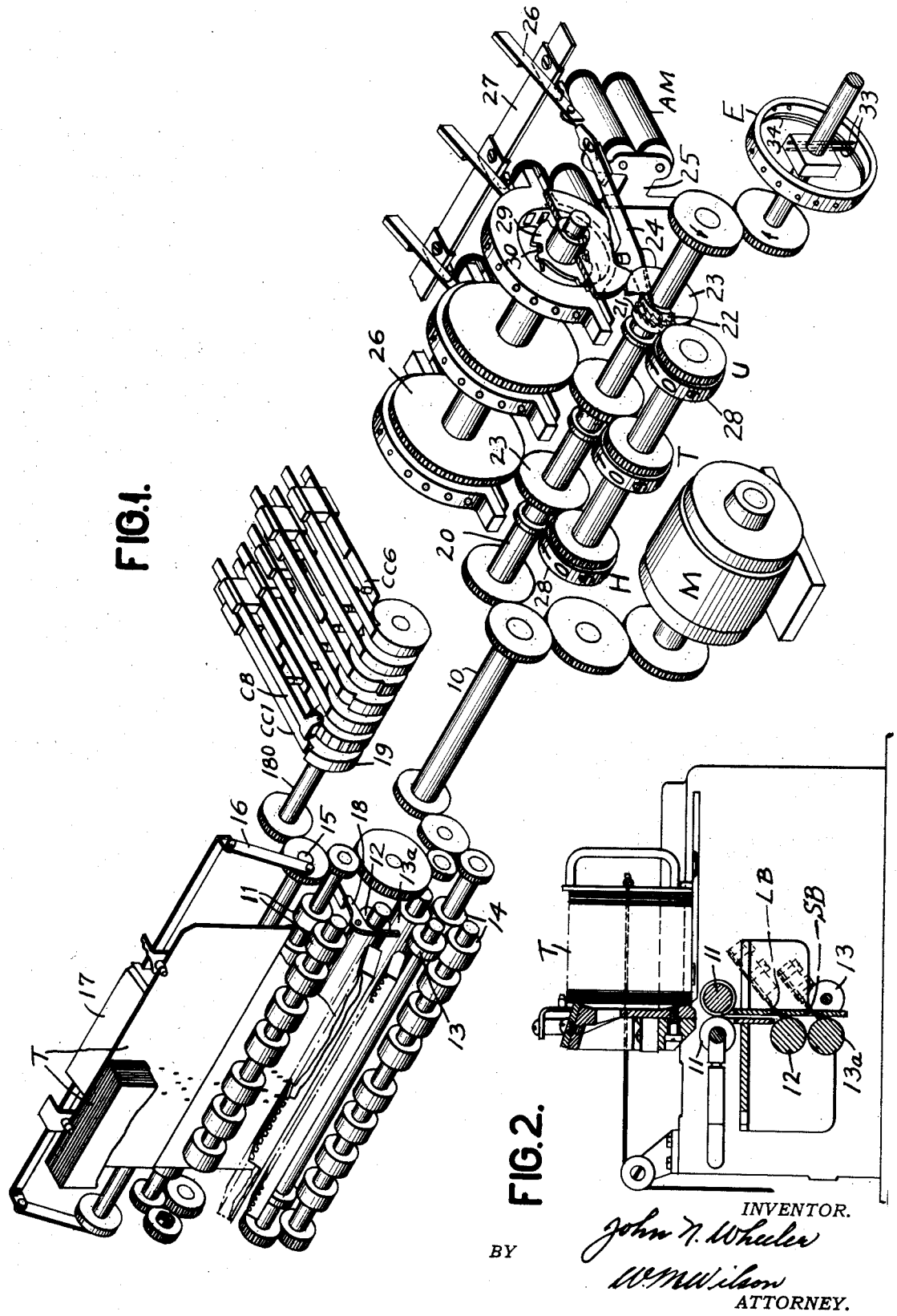
INVENTOR.
John N. Wheeler
BY
W. M. Wilson
ATTORNEY.

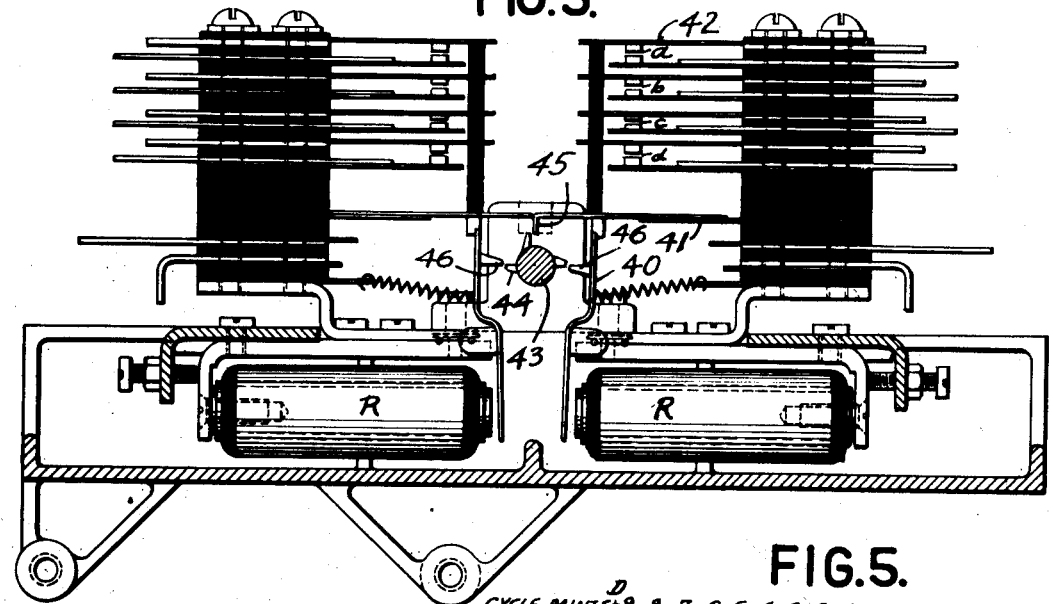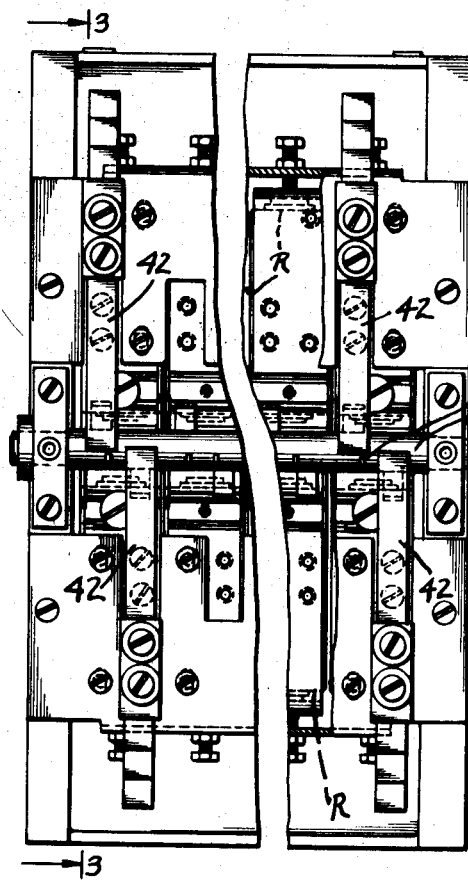

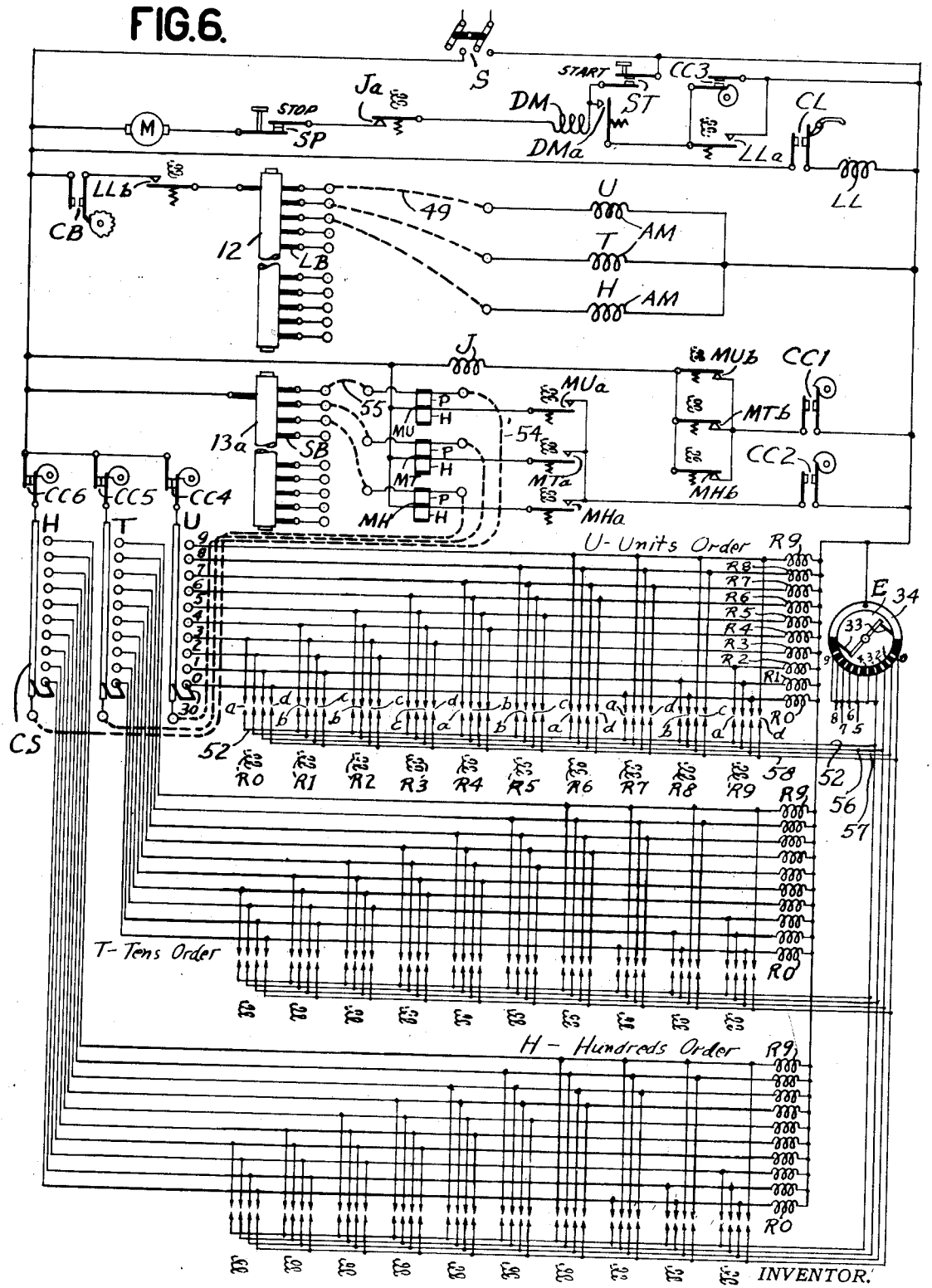

Patented Nov. 6, 1945

2,388,354

UNITED STATES PATENT OFFICE 2,388,354

ACCOUNTING MACHINE

John N. Wheeler, Hawthorne, N. Y., assignor to International Business Machines Corporation, New York, N. Y., a corporation of New York Application January 15, 1943, Serial No. 472,466

10 Claims. (Cl. 235—61.7)

This invention concerns record-controlled accounting machines. In such machines, a record is sensed for designations to control entry receiving and manifesting operation of entry receiving and manifesting means. Such means may embrace value or character recording means or a value register to receive a single entry, as for group indicating purposes. Such entry receiving means may include an accumulator to receive successive cumulative value entries and to manifest their total or algebraic summation.

The general object of this invention is to check the accuracy of the entry receiving and manifesting operation of an entry receiving means, such as described above, against the entry controlling designation on the record.

Further, an object is to check a value receiving operation of entry receiving means such as a value register against the entry controlling designation.

An object is, further, to check a value receiving or entry manifesting operation against a controlling designation which has previously initiated such entry operation.

An object is, also, to check a cumulative operation of entry receiving means such as an accumulator against the control designation which initiates the cumulative entry operation.

Stated differently, an object is to check the value entry operation of an accumulator, starting from any value position, against the designation which caused the entry operation to occur.

An object is to check entry receiving operation of entry receiving means during the same run of a record through the machine as the one in which it is sensed for an entry control designation.

The object is, further, to check the entry receiving operation in the same cycle as the one in which entry operation was initiated by the designation to be checked against the entry operation.

Other objects of the invention will be pointed out in the following description and claims and illustrated in the accompanying drawings, which disclose, by way of example, the principle of the invention and the best mode, which has been contemplated, of applying that principle.

The invention, while generally applicable to record-controlled accounting machines, is herein disclosed as preferably applied to a record-controlled accounting machine such as shown in Patent No. 1,976,617 to Lake et al. Only as much of this machine will be explained as is necessary to an understanding of the invention.

In the drawings:

Fig. 1 shows, diagrammatically, card feeding, accumulating, and contact mechanisms.

Fig. 2 is a sectional view of the card feeding and sensing mechanisms, including a supplemental sensing station utilized in the present invention.

Fig. 3 shows a pair of electromechanical relays of a plurality of such relays herein used.

Fig. 4 is a top view, partly broken away, of the electromechanical relay assembly of Fig. 3.

Fig. 5 is a timing chart.

Fig. 6 is a wiring diagram.

Referring to Fig. 1 motor M drives a shaft 10. Such drive may be effected, as usual, through a so-called tabulating clutch which is not shown. Shaft 10 is geared to the shafts of feed rolls 11, contact roll 12, feed rolls 13—13a (of which 13a comprises a supplementary contact roll utilized for the present invention) and feed rolls 14. In addition, the gearing drives a shaft 15 which causes reciprocation of a pitman 16 to actuate picker 17. Upon each forward stroke of the picker, it feeds a card T to the feed rolls which continue the card feed uninterruptedly. As the card reaches the contact roll 12, it operates a card lever 18 to close card lever contacts CL (shown in the circuit diagram, Fig. 6). Coacting with sensing roll 12 is the regular set of sensing brushes LB. Coacting with contact roll 13a is a supplementary set of sensing brushes SB utilized for the purposes of the present invention and hereafter referred to as the checking brushes. Brushes SB and roll 13a are spaced from the regular sensing station a distance which is equivalent to approximately 3½ cycle points (see Fig. 5); that is, a given point of a card will move from a brush LB to a brush SB approximately in 3½ cycle points.

Picker operating shaft 15 is geared to a shaft 180 which has cams 19 for operating cam contacts CC1 to 6 (also see Fig. 5) and circuit breaker CB.

Shaft 10 drives a clutch shaft 20 to which clutch elements 21, one for each accumulator order, are keyed. Three orders U (units), T (tens), and H (hundreds) are shown, but it is evident that more or less orders may be used. Facing each clutch element 21 is a driven clutch element 22 fixed to a gear 23. A clutch shifting lever 24 is normally latched in the position shown in Fig. 1 by the armature 25 of an entry control magnet AM of the related order. When the magnet is energized, lever 24 is unlatched and rocked by a flat spring 26 to shift the clutch element 21 into engagement with clutch element 22 to effect rotation of gear 23. All the unlatched levers 24 of the different orders are relatched and the clutch elements disengaged during the 0 time of the cycle (see Fig. 5) by the usual restoring bar 27. The time at which such clutch disengagement occurs may be referred to as the knock-off time (Fig. 5).

During the period of rotation of gear 23, it drives an indicating wheel 28 and the brush holder 29 of a readout commutator order. The gear ratios between the gear 23 and the wheel 28 and brush holder 29 are such as to effect half a revolution of the brush holder for one revolution of the wheel 28. As usual, the brush holder carries diametrically opposite brushes 30 (diagrammatically shown in Fig. 6). In half a revolution of the brush holder, one brush 30 wipes a common contact segment CS while the other brush successively wipes contact segments 0 to 9. In the next half of a revolution, the functions of the brushes are reversed. The brushes 30 of each order are conductively connected.

Shaft 20 drives the brush holder of an emitter E. In each cycle, while one of the brushes 33 is wiping a common contact ring 34, the other brush 33 wipes emitter spots 9 to 0 at the times indicated in Fig. 5. The emitter E is shown diagrammatically in Fig. 6.

For a purpose which will be explained in the description of the circuits, electromechanical relays are provided. These relays are substantially the same as disclosed in Patent No. 2,161,614, and two of them are shown in Figs. 3 and 4. There are ten such relays for each accumulator order and, considering three orders, for the sake of convenience, thirty relays are provided. These relays are generally designated R and the set of relays of each order may be further designated by appending the value 0 to 9 to which they relate (see Fig. 6). The three orders shown herein are designated U (units), T (tens), and H (hundreds), as seen in the circuit diagram, Fig. 6. Referring to Fig. 3, energization of a relay R unlatches its armature 40 from a blade 41. Blade 41 supports, through insulation, the upper spring metal, contact blades 42 of four relay contacts a, b, c, and d for each relay. When the blade 41 is unlatched by energization of a relay coil R, all the four contacts of this relay close. A restoring shaft 43 makes one revolution each cycle. The shaft has three projections 44, one of which engages lugs 45 on blades 41 to lift the blades and the other two of which engage lugs 46 on armatures 40 to restore the armatures positively. The lifting of blades 41 and the concurrent restoration of the armatures relatches the blades, and the relay contacts are thereby restored to open condition.

*Circuits and operation*

To start operation, the operator, after closing main switch S (Fig. 6), depresses the start key to close contacts ST. The motor circuit is thereby closed from the left side of the line through motor M (also see Fig. 1), stop key contacts SP, normally closed relay contacts Ja, motor relay DM, and key contacts ST to the right side of the line. Relay DM closes contacts DMa. When the first card has moved a sufficient distance to cause card lever contacts CL to close, card lever relay coil LL is energized. This relay coil thereupon closes contacts LLa. Contacts LLa and DMa form one shunt path for the motor circuit, by-passing the start key contacts. Between cards, the card lever contacts CL open and relay coil LL is deenergized. At such time, the cam contacts CC3 (also see Fig. 5) are closed to by-pass the contacts LLa, keeping the motor circuit closed through a second shunt path. When the last card has passed the regular and supplementary sensing station cycle, the card lever contacts CL do not reclose before contacts CC3 open in the cycle, and the motor circuit will be broken upon the opening of the latter contacts, and the machine will stop at the end of the cycle.

When a card is fed past the regular sensing station, the index positions 9 to 0 traverse the brushes LB in succession at the 9 to 0 cycle points. Assume, for instance, that the units order column of an amount field on a card has a 9 designation. This designation reaches a brush LB at the 9 time of the cycle, and a circuit is closed as follows: From the left side of the line, via contacts CB (also see Fig. 5), card lever relay contacts LLb, contact roll 12, the brush LB sensing the designation, a plug connection 49 to the units order entry magnet AM, thence through the magnet to the right side of the line. Energization of magnet AM causes clutch elements 21 and 22 of the units order to engage and rotate gear 23 which drives the units order indicating wheel 28 and the readout brush holder 29. There is a mechanical lag between the making of the circuit and the commencement of rotation of gear 23. This mechanical lag is equivalent to approximately four-fifths of a cycle point. Thus, the making of the circuit at the 9 cycle time does not cause the readout brushes 30 to start moving until approximately one-fifth of a cycle point before the 8 cycle time. The readout segments and the spaces between them are each of a length equivalent to one-half cycle point. Due to the width of the brush 30, it wipes a readout segment for slightly longer than half a cycle point. Assuming the brush 30 is initially engaging the middle of the 0 readout segment, it starts moving off this segment just before the 8 cycle time, wipes across the space between the 0 and 1 readout segments, and arrives at the middle of the 1 segment just before the 7 cycle time, as roughly indicated in the timing chart, Fig. 5. Brush 30 will continue to move through nine such increments from segment to segment until the knock-off time (Fig. 5) when the clutch elements 21 and 22 are completely disengaged. At this stage, as a result of the sensing of the 9 designation, the accumulator order, starting from 0, has advanced nine steps and a readout brush 30 is on the 9 segment. This constitutes the 9 entry operation of an accumulator order, and the value position of the order at each step of the entry is manifested by the engagement of a particular value readout segment by a brush 30. In a known manner, the value may be read out under control of the readout commutator to cause the value to be recorded.

When an 8 designation is sensed in a card column, the brush 30 will not start moving until just before the 7 cycle time and will move eight steps before knock-off time, at which stage it will be engaging the 8 readout segment, assuming it started from the 0 segment. The entry of values 7 to 1 under control of designations 7 to 1, respectively, may be understood from the above description and from the timing chart, Fig. 5. The lines marked "9 entry" to "1 entry" show the cycle time duration of engagement of the various readout segments by a brush 30 for different value entries.

When a lower order passes from 9 to 0 as a result of a value entry, carry means, not shown here, and disclosed in detail in aforementioned Patent No. 1,976,617 effects a carry into the next higher order. In the present machine, this carry takes place just before the 15 cycle time and the brush 30 does not move off the segment previously engaged thereby until the 15 cycle time. In the timing chart, Fig. 5, the dotted line between the 15 cycle line and the D line indicates that in the absence of a carry, the brush 30 remains engaged with the segment last indicated. The carry means is not shown here because it does not enter into the present invention. The timing of the carry operation is explained here to indicate that it does not interfere with the checking operations which occur prior to the carry time. The checking operations will now be described.

Assume the units order is initially in 0 value position. Accordingly, before entry operation may begin in a cycle, a circuit is established from the left side of the line (Fig. 6), via cam contacts CC4, common segment CS of the units order, brushes 30, the 0 value segment, and through relay coil RO of the units order, to the right side of the line. Relay coil RO, upon energization, unlatches the related relay contacts a to d which thereupon close. The relay contacts remain closed until mechanically restored, in a manner previously explained, shortly after the 14 cycle time. Similarly, if an accumulator order, at the beginning of a cycle, is on one of the value segments 1 to 9, relay coils R1 to R9, respectively will be energized and their related relay contacts closed. The circuits of relays R for the tens and hundreds orders are similar to those for the units order, and include cam contacts CC5 and CC6.

As stated before, the checking brushes SB (Fig. 2) are approximately a distance from brushes LB equivalent to 3½ cycle points. Thus, a designation on the record card, will reach a brush SB about 3½ cycle points after it has been engaged by a brush LB and will be sensed by the checking brush during the latter half of a cycle point. It is in such portion of a cycle point that the readout brushes ride onto readout segments during entry operations, and the concurrent sensing of designations by checking brushes and engagement of readout segments by readout brushes are required for checking operations, as will be clear later. Thus, the spacing between brushes LB and SB equivalent to 3½ cycle points provides for concurrent times of readout segment engagement and designation sensing by brushes SB. If brushes LB and SB were spaced the equivalent of 3 cycle points, the concurrence of readout segment engagement and sensing by a checking brush of a designation would be too brief in view of the mechanical and electrical lag of elements of the checking means. However, while a spacing equivalent to 3½ cycle points between brushes LB and SB is found to be most suitable, other spacings could be used so long as they served the purposes of the invention. The emitter E is timed with the travel of the designation positions 9 to 0 past the checking brushes; this is, a brush 33 of the emitter engages emitter spots 9 to 0 as the designation positions 9 to 0 pass the brushes SB. Assume an accumulator order, say the units order, is initially in 0 value position, so that relay RO of the units order has been energized and related relay contacts a to d have been closed before entry operation begins. Assume, further that a 9 designation is sensed by a brush LB to cause a 9 value entry to be made. This 9 designation is sensed by a brush SB approximately 3½ cycle points later, and while the designation is being sensed thereby, brush 33 of emitter E wipes the 9 emitter spot. Reference to Fig. 5 shows that while brush 33 of emitter E is wiping the 9 emitter spot, the brush 30 of the readout commutator, should be moving, as a result of entry operation initiated by the sensing of a 9 designation by a brush LB, across the 3 readout segment. If the entry operation has been correctly initiated by the sensing of the 9 value designation by a brush LB and if the 9 value entry operation is taking place in accordance with the 9 value designation, then the brush 30 will be on the 3 readout segment as the emitter E is in the 9 position and as the 9 designation is under a checking brush SB. Under these conditions, the following circuit will be closed: From the right side of the line (Fig. 6), via the common 34 of emitter E, the brushes 33, the 9 emitter spot, the wire 52, the a relay contacts (now closed) associated with relay coil RO, the 3 readout segment of the units order, brushes 30, common segment CS, a plug connection 54; thence through the pick up coil P of a duo wound relay magnet MU (units order checking magnet), via another plug connection 55, the checking brush SB now sensing the units order designation 9, the contact roll 13a, and to the left side of the line. The pick up coil P of the magnet MU, upon energization, closes relay contacts MUa, establishing a circuit through holding coil H of magnet MU, as follows: From the left side of the line, through said coil H, the now-closed contacts MUa, and via cam contacts CC2 to the right side of the line. Coil H of MU remains energized until near the end of the cycle, and maintains normally closed contacts MUb open.

Similarly, checking circuits are established for the tens and hundreds orders to energize coils MT and MH, respectively, if the positions of the readout commutators of these orders checks with the sensing of the value designations by the checking brushes SB. Cam contacts CC1 close at about 15½ of the cycle to test the checking conditions. If the entry operations in all the orders correspond to the entry control designations on the record, as sensed by the checking brushes, all of the contacts MUb, MTb, and MHb will be open at the time cam contacts CC1 close and a circuit will not be made through relay coil J. On the other hand, if the entry operation in any order does not correspond to the checked entry controlling designation, the related magnet MU, MT, or MH will not be energized and the associated contacts will remain closed. Then, when cam contacts CC1 close, coil J will be energized. Contacts Ja in the motor circuit will open, and the machine will stop.

Assume, for example, that with the units order standing initially at zero, a 9 designation is sensed by brush LB of the units order column and that the 9 entry operation is not properly initiated or is not initiated at all. Then, when emitter E brush 33 is on the 9 emitter spot, the brush 30 of the units order readout commutator will not be on the 3 readout segment and the circuit which extends from the emitter through wire 52 and contacts a (now-closed) of relay coil RO to the read-out segment 3 will be broken at this point. Assume, further, that the readout brush 30 engages readout segment 3 a cycle point later than the correct time. The emitter E will then have its brush 33 on the 8 spot and the circuit will extend therefrom via wire 52, contacts a of relay RO, the 3 readout segment of the units order, brushes 30 thereof, plug connection 54, pickup coil P of magnet MU, plug connection 55 and to the checking brush SB sensing the units order value column of the amount field of the record. At this time, the 9 entry control designation in the units order column has already passed beyond the brush SB. Hence the checking circuit cannot be completed.

Comparison of the 9, 8, 7, 6, 5, 4, and 3 entry lines of the timing chart with the emitter E positions indicates that if these entry operations are correctly effected under control of 9 to 3 designations, respectively, these designations will be under the checking brushes as the readout brush 30 is on the readout segment 3, and the checking circuits will be completed. For a correct 2 entry initiated by a 2 designation, the brush 30 will be on readout segment 2 as the 2 designation is under brush SB and as the emitter E brush 33 is on the 2 spot. The checking circuit is then established from the 2 emitter spot via a line 56 through the b contacts of relay RO, the 2 readout segment, brushes 30, and as before through coil P of magnet MU. For a correct 1 entry initiated by a 1 designation, the checking circuit will extend from spot 1 of the emitter via a wire 57 and the c relay contacts of relay coil RO to the 1 readout segment and will be completed as before. If the designation is 0, then an entry operation should not be initiated and the accumulator order should stay in its former value position when the 0 designation is sensed by the checking brush. Thus, if the order is at zero, the checking circuit will extend from the 0 spot of the emitter E, via a wire 58 and the relay contacts d of the relay RO to the 0 readout segment, and will be completed as before.

Assume that an 8 designation is in the units order column of the record and that entry operation has incorrectly started one cycle point before it should have started for an 8 entry. Accordingly, the readout brush 30 will be on the 4 segment as the 8 designation is under a checking brush SB. The checking circuit will extend from the emitter E spot 8 via wire 52 and relay contacts a of relay RO to the 3 readout segment and, since the brush 30 is then on the 4 segment, the circuit will be unable to continue.

In the manner described hereinabove, checking circuits will be completed only when the entry operation of each order corresponds to the entry controlling designations on the record. Should an entry operation fail to match the controlling designation, one of the magnets MU, MT, or MH will remain deenergized and contacts MUb, MTb, or MHb will remain closed when cam contacts CC1 close. Accordingly, coil J will be energized, contacts Ja will open, and the motor M will stop, so that card feed will be interrupted.

Thus far, it has been assumed that each order started from zero value position. If an order is initially in value positions 1 to 9, the readout segment engaged by a brush 30 at the checking time for the controlling designation will be one to nine steps in advance of the segment engaged when the order starts from zero. For instance, considering a 9 controlling designation, this designation is at the checking station as emitter E brush 33 engages emitter spot 9. Referring to Fig. 5, when the accumulator order starts from zero, the 3 readout segment should be engaged by brush 30 at the 9 designation checking time. If the order starts from 1 position, the 4 segment should be engaged at this checking time. Likewise, if the order starts from 2 to 6 position, the segments 5 to 9, respectively, should be engaged by brush 30 at the 9 designation checking time. If the order starts from the 7 value position, then the 0 segment should be engaged at the 9 designation checking time, if the order starts from the 8 position, the 1 segment should be engaged at this checking time, and if the order starts from the 9 position, the 2 segment should be engaged at this checking time. Similarly, the segment which is engaged at any other checking time for an entry controlling designation should be the one which is as many steps in advance of the segment engaged when the order starts from zero as the value position from which the order actually starts is ahead of the zero position. For instance, considering a 1 entry controlling designation which has a checking time between approximately 12⅝ cycle time and the 13 cycle time, the segment which should be engaged at this time if the order starts from zero is the 1 segment. If the order starts from 1 to 9 value position, then the segments which should be engaged are, respectively, the 2 to 0 segments. To provide for checking the entry operation when the order starts from any value position 0 to 9, the set of relays R0 to R9 for each order is provided. It will be recalled that these relays are energized respectively when the related order readout commutator is in value positions 0 to 9. Energization of one of these relays causes the set of related relay contacts a, b, c, and d to be closed in the manner already explained. The closure of the relay contacts of the selectively operated relay properly correlates the readout segments with the emitter E in accordance with the cumulative entry operations starting from different value positions of the accumulator order.

Assume, for example, that the units order starts from 1; hence relay coil R1 is energized and contacts a, b, c, and d thereof are closed before entry operation begins. It will be seen from Fig. 6, that these relay contacts connect the lines 52, 56, 57, and 58 to readout segments which are one step ahead of the segments connected to these lines by the contacts a to d of relay R0. If the order starts from 2, the relay R2 is energized and the contacts a to d thereof connect lines 52, 56, 57, and 58 to segments two value steps higher than the segments connected to these lines by the zero relay contacts a to d of relay R0. Similarly, the other groups of relay contacts associated with relays R3 to R9 connect the lines 52, 56, 57, and 58 to readout segments which are 3 to 9 steps in advance of the segments connected to these lines through the contacts of the zero relay. Line 52 is common to the E emitter spots 9 to 3, line 56 is connected to the 2 spot, line 57 to the 1 spot, and line 58 to the 0 spot. Thus, the relay contact groups associated with an accumulator order are selectively closed according to the starting value position of the order so as to change the correlation between the emitter spots and the readout segments in accordance with the starting value position. For example, assume the units order starts from 3 and a 9 entry control designation is sensed by a brush LB to initiate a 9 entry. The 9 designation should be at the checking station as the readout segment 6 is engaged by a brush 30. At this checking time, a checking circuit should be complete from the right side of the line via the emitter E common 34, brushes 33, and spot 9 to line 52, thence via the relay contact a of relay R3, to the 6 readout segment, the brushes 30, segment CS, plug connection 54, coil P of relay magnet MU, plug connection 55, checking brush SB, contact roll 13a to the left side of the line. Assume, instead, that the order started from 9. The checking circuit will then be routed via the a contacts of relay R9 to the 2 readout segment. This 2 readout segment is nine steps ahead of the 3 segment which should be engaged when the order starts from 0 and a 9 entry designation has been sensed (see Fig. 5). As another example, assume the order starts from 9 and a 2 designation is sensed to initiate a 2 entry. The readout segment which should be engaged at the 2 designation checking time is the 1 segment; that is, the one which is nine steps ahead of the 2 segment which should be engaged had the order started from zero (see Fig. 5). The checking circuit is then routed from the 2 spot of emitter E via wire 56, the b contact of relay R9, to the 1 segment. Assume, further, that a 1 entry control designation is sensed and the order starts from 9. The checking circuit will then extend from the 1 spot of emitter E via wire 57 and contacts c of relay R9 to the 0 readout segment; i. e., the one which is 9 steps ahead of the 1 segment engaged when the order starts from zero and a 1 designation is sensed. Assume the order starts from 9 and a zero designation is in the units order of the amount field of the record. The readout segment which should be engaged at the 0 designation checking time is the 9 segment. The checking circuit is routed from the 0 emitter spot to line 58 and via the d contacts of relay R9 to the 9 readout segment.

In the above manner, cumulative value positions of an order are checked against the designations which control operation of the order to receive the entry which is to be cumulatively added to the previous variable value manifested by the order.

The operation and purpose of the set of relays R0 to R9 for the tens and hundreds orders are the same as for the units order.

It will be noted that except for a 3, 2, or 1 value entry or when a 0 perforation is sensed, the final position of the accumulator wheel at the end of an entry will not be directly checked. However, if the entry operation is properly initiated and the accumulator wheel advances properly to the particular value position which is directly checked, the possibility that it will not correctly complete its value advance is extremely remote. Hence, for all practical purposes, it may be considered that all value entries are satisfactorily checked against their initiating designations on the records.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a cyclically operating machine having sensing means to which records are fed, one each cycle, to be sensed for value representations and having a value register progressively moved through successive value positions under control of the sensing means and in accordance with a value representation sensed thereby on a record, the combination with value readout means associated with the register, of supplemental sensing means to which each record is fed to be sensed for value representations after such representations have been sensed by the first mentioned sensing means, a machine control device, and means controlled conjointly by the supplemental sensing means and the value readout means for selectively governing the machine control device according to whether the value position read out by the readout means, at the time the supplemental sensing means senses the value representation on the record, is consistent with the representation on the record being sensed by the supplemental sensing means.

2. In a machine in which records are fed in succession past a first sensing station and a second, following sensing station and having sensing means at the first station for sensing each record for value representations and having entry receiving means operable through successive value positions under control of said sensing means in accordance with a value representation on a record, the combination with means, associated with the entry receiving means, to manifest the value positions thereof, of supplemental sensing means located at the second station to sense the record for value representations after such representations have been sensed by the preceding sensing means, a machine control device, and means conjointly controlled by the supplemental sensing means and the value position manifesting means for governing operation of the machine control device selectively according to whether the value position of the entry receiving means, at the time the supplemental sensing means senses the value representation on the record is consistent with the representation sensed by the supplemental sensing means.

3. In a machine in which records are fed in succession past a first sensing station and a second sensing station and having sensing means at the first station for sensing each record for value representations and having entry receiving means operable through successive value positions under control of said sensing means and in accordance with the representations sensed on a record, the combination with electrical readout means adjusted by the entry receiving means to read out the value positions thereof, of supplemental sensing means at the second station to sense a record for value representations after such representations have been sensed by the first sensing means and controlled said operation of the entry receiving means, circuits controlled by the electrical readout means and the supplemental sensing means for comparing the value positions of the entry receiving means, at the times the supplemental sensing means senses the value representations, with the representations being sensed by the supplemental sensing means, and electrical means selectively controlled by the circuits according to the comparison.

4. In a cyclically operating machine having value accumulating means and in which records are successively fed past first and second sensing stations and having means at the first station for sensing one record each cycle, while the record is in motion, for value representations to control differential operation of the value accumulating means through successive value positions, the combination with value readout means controlled by the accumulating means to read out the value positions thereof, of supplemental sensing means at the second station to sense the value representations of the record while in motion after such representations have been sensed by the first sensing means to control operation of the accumulating means, a machine control device, means conjointly controlled by the supplemental sensing means and the value readout means for comparing the value positions of the accumulating means, at the times the supplemental sensing means senses the value representations, with the value representations being sensed by the supplemental sensing means, and means controlled by the comparing means for selectively controlling said machine control device.

5. In a cyclically operating machine having an accumulator and in which records are fed past first and second sensing stations in succession and having electrical means at the first station for sensing the records, one each cycle, while in motion for value representations to initiate differential operation of the accumulator to receive the represented values, the combination with value readout commutators of the accumulator, of supplemental electrical sensing means, at the second station, to sense each record, while in motion, for value representations after such representations have been sensed at the first station to initiate the accumulator operation, circuits controlled conjointly by the supplemental sensing means and the readout commutators in accordance with whether the values read out of the accumulator at the times the value representations are sensed by the supplemental means are consistent with the value representations, and machine control means selectively controlled by said circuits.

6. In a cyclically operating machine having an accumulator and in which records are fed past first and second sensing stations in succession and having electrical means at the first station to sense one record each cycle, while the record is in motion, for value representations to initiate differential entry receiving operation of the orders of the accumulator, the combination with value readout commutators for the orders of the accumulator, of supplemental electrical means, at the second station, to sense each record, while in motion, for value representations during the same cycle in which the representations were sensed by the first electrical means to initiate entry receiving operation of the accumulator orders, circuits established through the supplemental sensing means and the readout commutators when the values read out by the commutators are consistent with the representations being sensed by the supplemental means, a machine control device, and means under control of said circuits for causing the machine control device to interrupt feed of the records when said circuits fail to be established during the cycle.

7. In a machine having an accumulator and in which records are fed in succession past first and second sensing stations and having sensing means at the first station to sense each record for amount representations to control accumulating operation of the accumulator, the combination with cumulative amount manifesting means for the accumulator, of supplemental means, at the second station, to sense a record for the amount representations after such representations have been sensed at the first station and have controlled the accumulator operation, elements selectively conditioned under control of the manifesting means in accordance with the amount standing in the accumulator prior to said accumulating operation, and means controlled by said elements and by said amount manifesting means and by said supplemental sensing means for determining, for each accumulator order, whether a particular cumulative amount stands in an accumulator order at the time the amount representation in the corresponding order of the record is being sensed by the supplemental sensing means.

8. In a machine having an accumulator and in which records are fed in succession past first and second sensing stations and having sensing means at the first station to sense each record for representations of the digits of an amount to initiate operation of the accumulator to accumulate the represented amount with an amount previously standing in the accumulator, the combination with value readout commutators for the accumulator orders, of orders of relay means selectively conditioned by the corresponding orders of commutators in accordance with the digits previously standing in the orders of the accumulator, supplemental means, at the second station, for sensing each record for the digit representations after these representations have been sensed by the first sensing means and initiated accumulator operation, and circuits controlled by said relay means and by the supplemental sensing means and by the value readout means for determining, for each accumulator order, whether a particular cumulative amount stands in an accumulator order at the time the digit representation in the related order of the record is sensed by the supplemental sensing means.

9. In a cyclically operating machine having an accumulator and in which records are fed in succession past first and second sensing stations and having means at the first station to sense one record, each cycle, while the record is in motion, for value representations to initiate differential value entry receiving operations of the orders of the accumulator, the combination with value readout commutators for the accumulator orders to continually manifest the value positions of the orders, of orders of relay means selectively conditioned by the corresponding orders of commutators according to the value positions occupied by the accumulator orders before said operations thereof have been initiated, supplemental, electrical sensing means, at the second station, for sensing the value representations of a record while the record is in motion during the same cycle in which the value representations of this record were sensed previously at the first station to initiate the entry receiving operations, an impulse emitter for emitting impulses in synchronism with the sensing of the value representations by the supplemental sensing means, circuits established through the impulse emitter, the relay means of each order, the corresponding orders of commutators, and the supplemental sensing means when proper value positions of the commutators are in the circuits at the times of the cycle in which the value representations are sensed by the supplemental means, and means, under control of said circuits, for governing machine operation.

10. In a machine such as defined in claim 9, said relay means of each order comprising contacts selectively closed to vary the circuit connections intermediate the commutator of the corresponding order and the emitter.

JOHN N. WHEELER.